L. CUBELIC.
COMBINED EMERGENCY AND THROTTLE VALVE.
APPLICATION FILED JULY 7, 1910.
1,020,685. Patented Mar. 19, 1912.
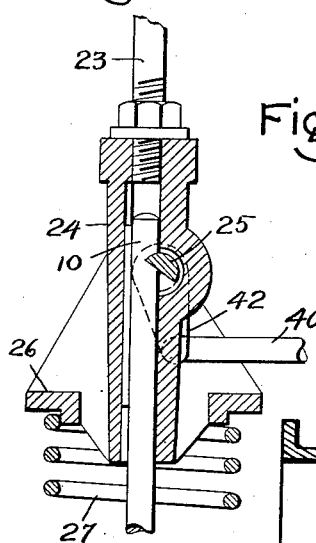
Fig. 4.
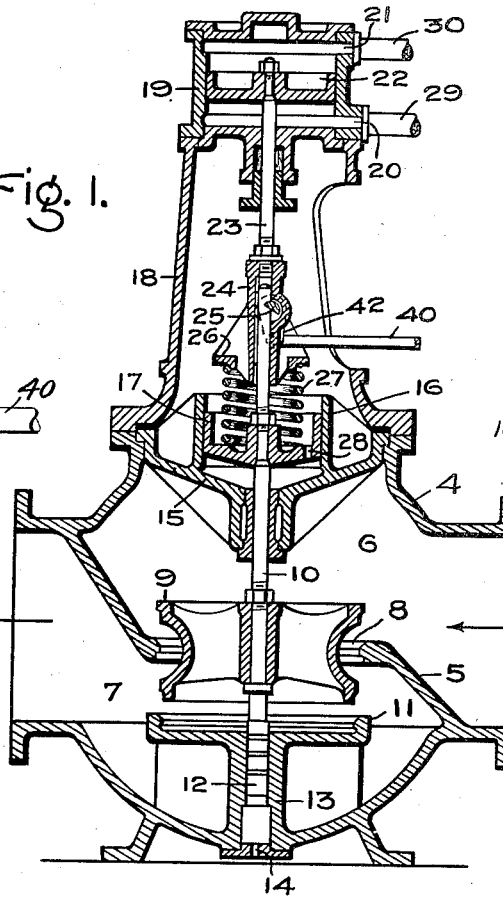
Fig. 1.
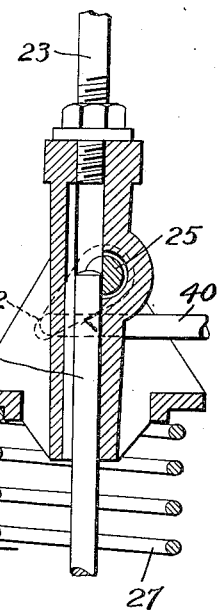
Fig. 5.
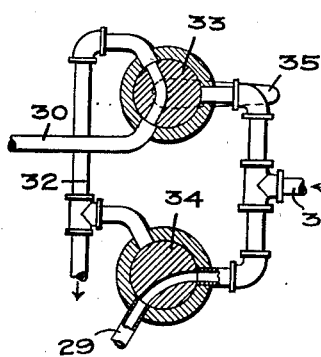
Fig. 2.
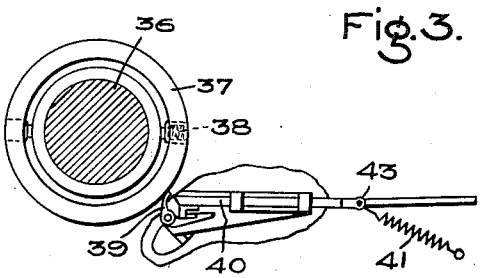
Fig. 3.
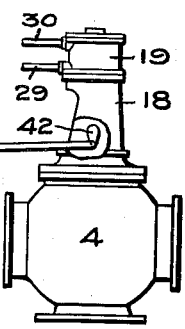
Witnesses:
Marcus L. Byng.
J. Ellis Glen.
Inventor,
Ludwig Cubelic,
by Albert G. Davis
Att'y.

UNITED STATES PATENT OFFICE.

LUDWIG CUBELIC, OF CHARLOTTENBURG, GERMANY, ASSIGNOR TO GENERAL ELECTRIC COMPANY, A CORPORATION OF NEW YORK.

COMBINED EMERGENCY AND THROTTLE VALVE.

1,020,685.

Specification of Letters Patent. Patented Mar. 19, 1912.

Application filed July 7, 1910. Serial No. 570,761.

*To all whom it may concern:*

Be it known that I, LUDWIG CUBELIC, a subject of the King of Prussia, residing at Charlottenburg, Germany, have invented certain new and useful Improvements in Combined Emergency and Throttle Valves, of which the following is a specification.

This invention relates to valves which combine the function of a throttle or stop valve and of an emergency valve so that one valve can be used to regulate the flow from a given region to another under ordinary conditions and also to shut off the flow suddenly under emergency conditions or whenever it is desirable or necessary.

The object of the invention is the provision of an improved valve of the type described which is simple in structure and efficient and certain in its operation under all conditions.

In the accompanying drawing illustrating one of the embodiments of the invention, Figure 1 is a sectional view of the valve; Fig. 2 is a diagrammatic view partly in section of a portion of the means for opening and closing the valve under ordinary circumstances; Fig. 3 is a diagrammatic view showing a speed responsive device for tripping the valve under an emergency condition; Fig. 4 is a detail view showing the connection between the two parts of the valve stem when said parts are in normal position; and Fig. 5 is a view similar to Fig. 4 showing the relation of the parts after the valve has been tripped.

The valve body or casing 4 has a diaphragm 5 which divides its interior into two chambers 6 and 7. The diaphragm is provided with a valve seat 8. The flow of fluid through this seat from the chamber 6 to the chamber 7 is controlled by a valve 9 mounted on a spindle 10. A seat 11 for the lower part of the valve 9 is arranged in the chamber 7 and the valve has passages through its interior so as to balance to a large degree, if not wholly, the fluid pressure on the valve when it is closed. The lower end portion of the spindle 10 is enlarged to form a piston 12 that slides in a cylinder 13 which communicates with the atmosphere by means of an opening 14 at one end so that there is a certain amount of pressure tending at all times to close the valve. The invention is not limited, however, to balanced valves or to valves having pistons similar to the piston 12 or to vertically arranged valves. The upper end of the chamber 6 is closed by a cap 15 having on its outer side an open-ended cylinder 16. The spindle 10 passes through the cap 15 and carries a hollow piston 17 which slides in the cylinder 16. A bonnet 18 is also mounted on the top of the chamber 6 and supports a cylinder 19 at its upper end. The cylinder has ports 20 and 21 at its ends. A piston 22 slides in the cylinder. The piston rod 23 projects through the lower cylinder head and forms a part of the stem or spindle for operating the valve under ordinary conditions.

A sleeve 24 is formed integral with or secured to the lower end of the rod 23. The upper end of the spindle 10 enters the bore of this sleeve and has a splined connection therewith. A locking device 25 rotatably mounted in the sleeve 24 engages a notch in the spindle 10 thereby uniting the rod 23 and the spindle 10 so that they form a spindle or stem for the valve under ordinary or normal conditions and connect the piston 22 with the valve 9. The sleeve 24 carries a flange 26 and between this flange and the piston 17 a spring 27 is arranged which is under compression when the rod 23 and the spindle 10 are locked together and moves the spindle away from the rod when the lock is released. Th space between the piston 17 and the bottom of the cylinder 16 forms a sort of dash-pot, the cushioning effect of which is regulated by a small opening 28 leading from one side of the piston to the other.

The valve is opened and closed under normal conditions by the action of a suitable fluid under pressure on the piston 22, but obviously the valve can be manipulated by other mechanism such as a hand-wheel, screw and nut, etc., if desired. In the form illustrated, the admission and exhaust of pressure fluid to and from the cylinder 19 is controlled by any suitable valve mechanism such as that shown diagrammatically in Fig. 2. The pipes 29 and 30 connect the ports 20 and 21 with the valve mechanism. A pipe 31 supplies fluid under pressure and an exhaust pipe 32 conveys fluid away from the cylinder. The flow to and from the cylinder is controlled by the valves 33, 34 shown for the sake of clearness as separate but they are preferably parts of one valve and operated by the same handle 35. The valve 34 is shown in a position to admit fluid from the pipe 31 through the pipe 29 to the lower side of the piston 22 to move the piston upwardly and open the valve while the valve 33 permits fluid from above the piston to pass through the pipe 30 to the exhaust 32. By moving the valve or valves to connect the pipes 30 and 31 and the pipes 29 and 32, the piston will be moved in a direction to close the valve 9. When the valve 9 has been moved to the desired extent, as above described, it can be maintained in its adjusted position by moving the valves 33, 34 to such a position that flow through pipes 29 and 30 is stopped.

Fig. 3 shows an arrangement for tripping the valve when the speed of the engine, turbine, etc., to which it supplies motive fluid exceeds a safe or desirable limit. The engine or turbine shaft 36 carries a ring 37 which rotates with the shaft and whose center of mass is eccentric to the axis of said shaft. This ring is mounted so that it can be moved transversely of the shaft under the influence of centrifugal force, said movement being opposed by a spring 38. At some predetermined speed of rotation, the centrifugal action of the ring overcomes the spring and the ring strikes a trigger 39, releasing a rod 40 from said trigger. The rod is then moved to the right by the spring 41. The right end of the rod 40 is connected to an arm 42 by which the locking device 25 can be rotated. When the rod 40 moves to the right, the device 25 is released from the spindle 10 and the spring 27 pushes the valve 9 down suddenly to its closed position assisted by any unbalanced pressure there may be on the valve. The sleeve 24 is made long enough so that the upper end of the spindle 10 remains within the end of the sleeve even when the valve is closed. The movement of the valve is checked as it nears its closed position by the cushioning action of the dash-pot formed by the piston 17 and the cylinder 16. The rod 40 is jointed at the point 43 to permit the outer end of the rod to move up and down with the sleeve and the lock as the valve is opened and closed under ordinary conditions without disturbing the emergency mechanism. Obviously the valve can be arranged to be tripped by hand instead of by the mechanism illustrated, if so desired.

After the valve has been tripped, it can be re-set for normal operation by forcing the piston 22, rod 23 and sleeve 24 downwardly against the action of the spring 27 until the lock 25 can be engaged with the notch in the stem 10, the rod 40 again engaging the trigger or latch 39. The spring 38 returns the ring 37 to the position shown when the speed falls to normal again. As soon as the mechanism is re-set as described, the valve is ready for operation, both as a throttle valve or stop valve or as an emergency valve, and there are no additional parts to be set or released which if forgotten by the attendant would prevent the valve from acting when the trip mechanism is actuated. This desirable and essential result is obtained by combining the coupling for the two parts of the valve stem and the locking device in one structure or member. The valve can be readily opened and closed under normal conditions and can be closed from any of its open positions by the trip mechanism in an emergency or whenever necessary for any reason.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. In combination, a valve, a divided stem for the valve, the ends of two adjacent parts of the stem being in sliding engagement with each other, abutments on said parts, spring means arranged between the abutments which tend to separate the parts of the stem, a device for normally locking the parts of the stem together, means for moving the stem to normally open and close the valve without varying the tension of the spring, and means for actuating said device under certain conditions to release the parts of the stem and permit the spring means to move the valve toward its closed position.

2. In combination, a valve having a tendency to close, a casing for the valve, a divided stem for the valve, one part of the stem carrying the valve and being arranged in the casing with both of its ends projecting through the walls of the casing, one end of said part being in sliding engagement with the end of the adjacent part of the stem, abutments on said parts outside of the casing, spring means arranged between the abutments which normally tends to separate the parts of the stem, a device for locking the parts together in opposition to the action of the spring means, mechanism for normally moving the stem axially to open and close the valve, and means for actuating said device to release the part of the stem carrying the valve from the other part, thereby permitting said spring means to move the valve toward its seat.

3. In combination, a valve, a divided stem for the valve, there being abutments on two adjacent parts of the stem, a spring arranged between the abutments which tends to separate said parts of the stem, means for coupling the parts together, and a device acting on said means to release the parts of the stem and permit the spring to separate them.

4. In combination, a valve, a stem for the valve formed in two parts and having abutments on said parts, there being a sleeve on the end of one part with the interior of which the end of the second part is in sliding engagement, a spring surrounding the stem and arranged between the abutments which tends to separate the parts of said stem, a device for locking the sleeve and the second part of the stem together, means for normally opening and closing the valve without varying the tension of the spring, and means for actuating said device to release the second part of the stem from the sleeve to permit the spring to separate the parts of said stem and close the valve under certain conditions.

5. In combination, a valve, a casing for the valve, a stem for the valve formed in two parts, one of the parts having an abutment thereon and the other part carrying the valve and having a piston thereon, a cylinder on the casing in which the piston is arranged to slide, a spring arranged between the abutment and the piston which tends to separate the parts of the stem, a device for locking the parts of the stem together under normal conditions in opposition to the action of the spring, means for normally opening and closing the valve, and means for actuating said device to release the parts of the stem and close the valve suddenly under emergency conditions, said piston and cylinder acting as a dashpot to retard the sudden movement of the valve before seating.

6. In combination, a valve, a stem for the valve formed in two parts, there being a sleeve on the end of one part with which the end of the second part is in sliding engagement, means which tends to separate the parts of the stem, a locking device rotatably mounted in the sleeve at one side of the stem which normally engages the second part of the stem and acts in opposition to said means to prevent its sliding in the sleeve, and mechanism for rotating said device to release the parts of the stem to the action of said means under certain conditions.

7. In combination, a valve, a stem for the valve formed in two parts, there being a sleeve on the upper part of the stem and the adjacent end of the lower part of the stem being splined in said sleeve, an abutment on the sleeve, an abutment on the lower part of the stem, a spring arranged between the abutments which tends to separate the parts of the stem, a device which normally holds the lower part of the stem in the sleeve against movement by the spring, and means for actuating said device to release said part to the action of the spring.

8. In combination, a valve, a stem for the valve that is formed in two parts, one of said parts having a sleeve portion with which the other part is in sliding engagement, abutments on the parts of the stem, spring means arranged between the abutments which tends to separate said parts, a locking device rotatably mounted in the sleeve portion at one side of the axis of the stem which normally engages the other part of the stem and acts in opposition to said means to prevent its sliding in the sleeve portion, and mechanism for rotating the device to release the parts of the stem to the action of said means to thereby close the valve under certain conditions.

9. In combination, a valve, a divided stem for the valve, there being abutments on two adjacent parts of the stem, spring means arranged between the abutments which tends to separate said parts, a device for locking said parts together in opposition to the spring means, mechanism for moving the stem to open and close the valve under normal conditions without affecting the tension of the spring, and means for releasing said device to permit the valve to close suddenly under emergency conditions.

In witness whereof, I have hereunto set my hand this 22d day of June 1910.

LUDWIG CUBELIC.

Witnesses:
J. TITMOLLER,
FRIEDRICH GANZERT.